US 12,341,947 B1

United States Patent
Ollila

(10) Patent No.: US 12,341,947 B1
(45) Date of Patent: Jun. 24, 2025

(54) METHOD AND SYSTEM FOR PROCESSING DUAL-STREAM IMAGES

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 47 days.

(21) Appl. No.: 18/392,307

(22) Filed: Dec. 21, 2023

(51) Int. Cl.
*H04N 13/324* (2018.01)
*G06T 5/50* (2006.01)
*G06T 5/92* (2024.01)

(52) U.S. Cl.
CPC ............ *H04N 13/324* (2018.05); *G06T 5/50* (2013.01); *G06T 5/92* (2024.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 2016/0182874 A1* | 6/2016 | Richards | ............... | H04N 23/90 348/187 |
| 2019/0362478 A1 | 11/2019 | Nanda et al. | | |
| 2020/0195910 A1* | 6/2020 | Han | ........ | H04N 13/25 |
| 2022/0292306 A1* | 9/2022 | Radhakrishnan | ...... | G06V 10/82 |

OTHER PUBLICATIONS

European Patent Office, Extended European Search Report, Application No. 24214152.1, Mailed May 7, 2025, 9 pages.
Liu et al, "Semantic-Aware Video 5,6,14 Style Transfer Based on Temporal Consistent Spare Patch Constraint", 2021, IEEE International Conference Onmultimedia and Expo, XP034124734, DOI: 10.1109/ICME51207.2021.9428352, Jul. 5, 2021, 6 pages.
Xie et al, "Image Style Transfer 5,6,14 Algorithm Based on Semantic Segmentation" vol. 9, 27, XP011849285, DOI: 10.1109/ACCESS. 2021.3054969, Jan. 27, 2021, 12 pages.

* cited by examiner

*Primary Examiner* — Clifford Hilaire
(74) *Attorney, Agent, or Firm* — Ziegler IP Law Group, LLC.

(57) ABSTRACT

Disclosed is a method and an apparatus for processing dual-stream images. The method includes processing a wide field-of-view (FOV) image stream using a first processing technique. The method further includes storing one or more of color information, gamma or tone mapping information, semantic information from the wide FOV image stream. The method further includes processing a narrow FOV image stream using a neural network based on the one or more of the white balance information, the gamma or tone mapping information, and semantic information. The method further includes blending the processed wide FOV image stream and the processed narrow FOV image stream to generate a final image, for display on a display device.

16 Claims, 2 Drawing Sheets

METHOD AND SYSTEM FOR PROCESSING DUAL-STREAM IMAGES

TECHNICAL FIELD

The present disclosure relates to a method for processing dual-stream images. Moreover, the present disclosure relates to a system for processing dual-stream images.

BACKGROUND

In the realm of image processing, particularly in systems involving multiple image streams such as dual FOV systems, significant challenges arise in ensuring consistency and coherence between different streams. On the other hand, the advent of technologies like virtual reality (VR) and augmented reality (AR), where immersive experiences are important, has increased the need for integration of these image streams. Any disparity in color, brightness, or dynamic range between the streams can disrupt the user experience.

Traditional systems have struggled with integrating these streams effectively, especially when they are processed using different techniques or when they provide vastly different perspectives or FOVs. A common problem in such systems is the variance in white balance, color temperature, and dynamic range between wide and narrow FOV image streams. This variance often arises from the different lighting conditions, perspectives, and compositional elements captured in each FOV. For instance, a wide FOV may include a broad panorama with varying lighting conditions, while a narrow FOV may focus on a specific object under a different lighting context. The challenge is further complicated when these streams are processed using different technologies, such as hardware-based image signal processors (ISP) or neural networks, leading to discrepancies in the final image output.

Existing solutions have not adequately solved these problems. They often require extensive manual adjustments or rely on simplistic blending techniques that do not account for the complex variations between image streams. Furthermore, such solutions do not dynamically adapt to changing conditions in real-time, which is important for applications like VR and AR, where immediate responsiveness to environmental changes is necessary for a realistic experience.

Therefore, in the light of the foregoing discussion, there exists a need to overcome the aforementioned drawbacks.

SUMMARY

The aim of the present disclosure is to provide a method and a system for integration of narrow and wide FOV image streams, particularly in systems where real-time processing and adaptability to varying conditions. The aim of the present disclosure is achieved by a method and a system for processing dual-stream images, as defined in the appended independent claims, which provide adaptive, intelligent, and integrative approach to dual-stream image processing by addressing the discrepancies between the different FOV streams and also ensuring that the final image maintains a high degree of consistency in all visual aspects. Advantageous features and additional implementations are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
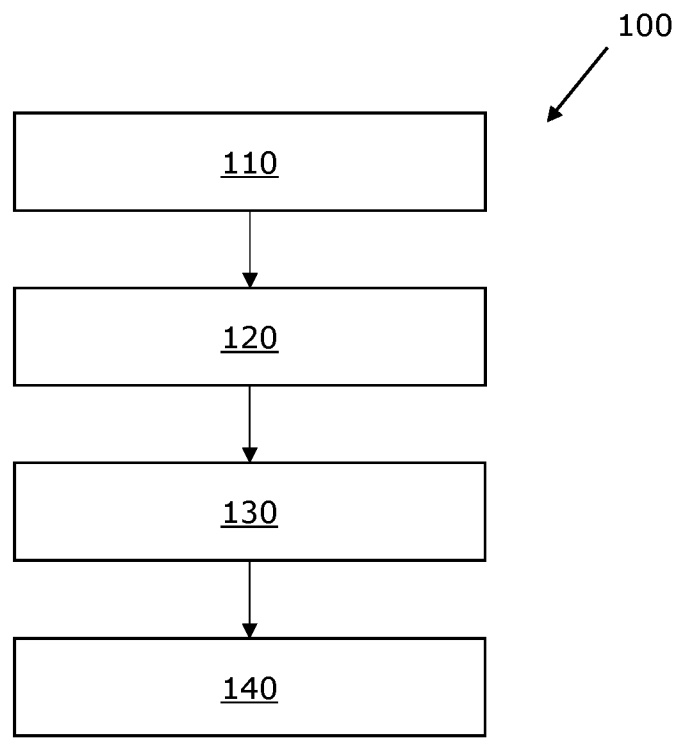
FIG. 1 is an illustration of a flowchart of a method for processing dual-stream images, in accordance with embodiments of the present disclosure.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, the present disclosure provides a method for processing dual-stream images, the method comprising:
  processing a wide field-of-view (FOV) image stream using a first processing technique;
  storing one or more of color information, gamma or tone mapping information, semantic information from the wide FOV image stream;
  processing a narrow FOV image stream using a neural network based on the one or more of the white balance information, the gamma or tone mapping information, and semantic information; and
  blending the processed wide FOV image stream and the processed narrow FOV image stream to generate a final image, for display on a display device.

In a second aspect, the present disclosure provides a system for processing dual-stream images, the system comprising:
  a first processing module configured to process a wide field-of-view (FOV) image stream using a first processing technique;
  a memory module configured to store one or more of color information, gamma or tone mapping information, semantic information from the wide FOV image stream;
  a second processing module configured to implement a neural network for processing a narrow FOV image stream based on the one or more of the white balance information, the gamma or tone mapping information, and the semantic information; and
  a blending module configured to blend the processed wide FOV image stream and the processed narrow FOV image stream to generate a final image, for display on a display device.

The present disclosure provides the method and the system for processing dual-stream images addressing the aforementioned challenges to ensure high-quality, consistent, and coherent output in image processing applications, particularly in environments where real-time processing is critical, such as in VR and AR systems. The present method and system involve processing a wide FOV image stream using a first processing technique; storing crucial image attributes from the wide FOV image stream, such as color information, gamma or tone mapping information, and semantic information; and then using this stored information to enhance the processing of the narrow image FOV stream using a neural network. Further, the process involves the blending of the processed wide and narrow FOV image streams to generate the final image in a manner that maintains color consistency, dynamic range, and visual coherence between the two streams.

In context of the present disclosure, "dual-stream images" refer to the simultaneous handling and processing of two distinct sets of image data, typically characterized by different fields of view (FOV). Herein, each stream represents a separate perspective or portion of a scene captured by imaging sensors. The term "dual-stream" refers to the concurrent nature of these image feeds, which are processed in parallel or in a coordinated manner. This approach is fundamental in applications requiring comprehensive scene analysis, such as in augmented reality (AR), virtual reality (VR), and advanced photographic systems, where the integration of multiple perspectives enhances the depth and quality of the visual experience. Further, the "wide FOV image stream" pertains to the set of image data capturing a broad perspective of a scene. This wide FOV typically encompasses a large area, offering an expansive view that includes extensive background elements and a wide-angle representation of the environment. In contrast, the "narrow FOV image stream" focuses on a smaller, more specific area of the scene, often targeting particular subjects or details. This narrow FOV image stream provides a zoomed-in view, offering higher detail and resolution for the selected portion of the scene.

The processing of the wide FOV image stream using the first processing technique refers to a series of computational and algorithmic steps to manipulate and enhance the raw image data captured in the wide FOV image stream. This processing is implemented to convert the raw visual data into a format that is suitable for further manipulation, analysis, or display. The first processing technique involves the application of a distinct set of algorithms, methodologies, or technologies specifically tailored for the wide FOV image stream. This processing technique is chosen based on its suitability to handle the broad nature of the wide FOV image stream. In a non-limiting example, the first processing technique involves implementing gray world algorithm, which is a classic auto white balance algorithm. The first processing technique for the wide FOV image stream may involve several components, including, but not limited to, image correction and enhancement, such as adjusting various attributes such as color balance, brightness, and contrast to ensure that the wide FOV image stream accurately represents the scene; distortion correction to ensure geometric accuracy in the captured images; dynamic range optimization to ensure that details in both highlights and shadows are preserved; and noise reduction to enhance image clarity.

In an embodiment, the first processing technique comprises utilizing one or more of a hardware-based image signal processor (ISP), a software-based ISP, a neural network. The hardware-based ISP refers to a dedicated physical component within a camera or imaging system designed to process raw image data captured by the sensor. These processors are optimized for high-speed, real-time image processing tasks, often yielding high-quality results in a time-sensitive manner. The software-based ISP performs similar functions to its hardware counterpart but does so through software algorithms running on a general-purpose processor, thereby offering greater flexibility and adaptability than hardware-based ISPs, as the software can be updated or modified without needing to change physical components. The neural networks, particularly those designed for image processing, can learn from vast amounts of data and adapt their processing strategies based on the learned patterns and features, potentially resulting in superior image quality and enhanced capabilities in handling diverse and challenging imaging scenarios.

This versatile approach provided by the first processing technique to image processing offers a range of options to suit different operational requirements and objectives. Each of these techniques possesses distinct characteristics and advantages, making them suitable for specific aspects of image processing in the wide FOV format. The choice between the hardware-based ISP, the software-based ISP, and the neural network, or a combination thereof, allows the process to be tailored to specific use cases, based on the priority for processing speed, image quality, adaptability, or advanced image analysis capabilities.

The storing of one or more of the color information (including white balance data), the gamma or tone mapping information, the semantic information from the wide FOV image stream occurs after the initial processing of the wide FOV image stream. The storage medium is typically a high-speed memory unit capable of handling large volumes of image data with minimal latency. This involves the capture and preservation of specific types of data from the wide FOV image stream, which may be required for subsequent processing steps, particularly for integrating and harmonizing this stream with the narrow FOV image stream.

As used herein, the "color information" pertains to a range of data related to the colors present in the wide FOV image stream and includes key attributes such as color balance and white balance, which are required for ensuring that the colors in the image accurately represent the scene as perceived by the human eye. "Gamma information" pertains to the luminance aspect of the image to understand how an image is perceived in terms of brightness and contrast. "Tone mapping information" is particularly relevant for images with a high dynamic range and include details about brightest and darkest areas in the image for displaying on standard devices. "Semantic information" pertains to data that provides context about the scene captured in the wide FOV image stream, and may include scene classification (e.g., identifying the scene as indoor or outdoor, landscape or portrait) and may extend to more advanced content analysis like object recognition.

In an embodiment, the wide FOV image stream is segmented corresponding to the narrow FOV image stream for extracting the semantic information. Herein, segmenting the wide FOV image stream involves dividing the broader scene into smaller, distinct sections or regions that correspond spatially and contextually to the area covered by the narrow image FOV stream. This process is designed to identify and isolate the part of the wide FOV image that is most relevant to the content captured in the narrow FOV. For instance, if the narrow FOV is focused on a specific object or subject within a larger scene, segmentation would involve identifying and isolating the portion of the wide FOV that includes this object or subject. Such segmentation may be achieved through various image processing techniques, including but not limited to, edge detection, region-based segmentation, or advanced pattern recognition algorithms, potentially leveraging machine learning or AI methodologies. Once the relevant segment of the wide image FOV stream corresponding to the narrow FOV is isolated, then semantic information from this segment is extracted. By segmenting the wide FOV image stream and extracting semantic information corresponding to the narrow FOV image stream, it may be ensured that the processing of the narrow FOV image stream is visually as well as contextually aligned with the wide FOV image stream, as required for the integration of multiple FOV streams as per the present disclosure.

In the present embodiments, the storing of information from the wide FOV image stream is characterized by the utilization of data from a previous frame, rather than the current frame being processed. The rationale behind using information from the previous frame is that successive frames in a video or a sequence of images are typically very similar, especially in scenarios where the scene or the lighting conditions do not change rapidly. Therefore, the white balance information, gamma or tone mapping values, and semantic information extracted from a preceding frame are usually a reliable approximation for the subsequent frame. Herein, the "previous frame" may be the immediately preceding frame or one from among the last several frames. It may also be appreciated that this approach is strategically adopted to mitigate potential time lags that may arise if the process may wait for the processing of the current frame of the wide FOV image stream.

Further, the narrow FOV image stream is processed using the neural network based on the one or more of the white balance information, the gamma or tone mapping information, and semantic information. As used herein, the "neural network" refers to a form of advanced computational model, to process image data captured within the narrow FOV image stream. Neural networks are capable of performing sophisticated image analysis and enhancement tasks, such as identifying and highlighting important details, correcting imperfections, and optimizing overall image aesthetics. As discussed, the narrow FOV image stream typically focuses on a specific, limited area of the overall scene. The use of the neural network is particularly advantageous in this context due to its ability to learn and adapt to complex patterns in image data. In an example, the neural network may include Unet, CNN, GAN and the like, where aforementioned information is inputted as additional layer with image data. For example, instead of 3 RGB or 4 RAW RGB, there may be additional layer(s). Information may be also given to inside layers of, for example, Unet rather than input layer (then, it may be downscaled information).

In general, this processing of the narrow FOV image stream using the neural network allows for leveraging advanced algorithms to enhance the quality of the narrow FOV image stream based on the stored attributes from the wide FOV image stream. This processing by the neural network may include adjusting the color temperature based on the stored white balance information, applying a color conversion matrix for color space consistency, and adjusting gamma or tone mapping values for dynamic range consistency. The neural network is also capable of utilizing semantic information to apply scene-specific image enhancements. For example, if the semantic information indicates a landscape scene, the neural network may enhance green hues and overall sharpness.

In an embodiment, processing the narrow FOV image stream comprises adjusting a color temperature of the narrow FOV image stream based on the color information from a previous frame of the wide FOV image stream to maintain color consistency with the wide FOV image stream. The color information, as discussed, typically includes aspects such as hue, saturation, and lightness, for determining the overall color balance of the image. By utilizing this information from the wide FOV image stream, the color temperature may be effectively adjusted in the narrow FOV image stream, ensuring that it aligns with the broader color profile of the scene from the wide FOV image stream. The adjustment of the color temperature in the narrow image FOV stream involves fine-tuning the image to correct any color imbalances and to match the color characteristics of the wide FOV image stream. This alignment helps in maintaining color consistency across the combined image output (as discussed later in the disclosure), where the two streams are to be blended (as discussed later in the disclosure), for rendering a visually coherent final image.

In an embodiment, processing the narrow FOV image stream comprises applying a color conversion matrix to convert a color space of the narrow FOV image stream based on the color information from a previous frame of the wide FOV image stream to maintain color consistency with the wide FOV image stream. The purpose of this color conversion matrix is to transform the color space of the narrow FOV image stream, aligning it with the color characteristics derived from the wide FOV image stream. The color conversion matrix is used in digital image processing to map or convert the color values from one color space to another, for ensuring uniform color representation across different imaging devices. Herein, the color conversion matrix is used to adjust the color space of the narrow FOV image stream, which may involve converting the sensor-specific color space of the narrow FOV image stream into a more standardized color space, such as sRGB or a wide gamut color space. This ensures that the colors in the final image are displayed accurately and consistently across various display devices, which may have different ways of interpreting color values. Given that color characteristics can vary significantly between different fields of view, especially when captured under varying lighting conditions or with different sensors, this ensures that the final combined image does not suffer from color discrepancies.

In an embodiment, processing the narrow FOV image stream comprises adjusting a gamma or tone mapping value of the narrow FOV image stream based on the gamma or tone mapping information from a previous frame of the wide FOV image stream to maintain dynamic range consistency with the wide FOV image stream. As discussed, the gamma adjustment in image processing involves modifying the luminance or intensity levels of an image, affecting the overall brightness and contrast. In contrast, the tone mapping is a technique used in high dynamic range (HDR) imaging to map a range of color intensities into a manageable and displayable format without losing significant image detail. Both these processes are integral to maintaining the dynamic range and visual integrity of an image, ensuring that it appears as natural as possible. Discrepancies in gamma or tone mapping between the two streams can lead to a final image where certain areas either appear too dark or too bright, or where details are lost either in the highlights or shadows. Such inconsistencies can significantly degrade the quality of the combined image. By adjusting the gamma or tone mapping values of the narrow image FOV stream based on information from the wide FOV image stream, the process ensures that the two image streams are aligned in terms of luminosity and dynamic range. This alignment is important, especially in scenarios where both streams are combined or viewed together, ensuring that the dynamic range of the narrow FOV image stream is harmonized with that of the wide FOV image stream.

In some embodiments, the method for processing the narrow FOV image stream involves an architecture that divides the Narrow ISP (Image Signal Processor) bus into two distinct parts, optimizing the processing workflow and reducing computational load. This division is designed to enhance the efficiency and effectiveness of the image processing, particularly for integrating the narrow FOV image stream with the wide FOV image stream. Herein, the first part of the ISP bus involves a neural network configured for initial image processing functions. Specifically, this neural network is responsible for demosaicking, which includes converting the raw image data into a full-color RGB (Red, Green, Blue) image. This process transforms the raw sensor data, typically captured in a Bayer filter mosaic format, into a coherent color image. Additionally, this neural network undertakes neural filling, which involves intelligently filling in missing or corrupted image data, and RAW noise removal, for enhancing image clarity and reducing visual artifacts. This process may involve one or a combination of a white balance coefficient and a color space conversion, in which the color information may be CCT (color temperature) or CCM (color correction matrix). The second part of the ISP bus also involves a neural network configured for color conversion. This involves converting the RGB image into a standard color space, such as sRGB, using a conversion matrix, to derive conversion matrix parameters, including the 3×3 RGB to sRGB conversion matrix and 1×3 white balance coefficients, from the wide-angle ISP block or, in the case of stereo pairs, from the average value of the wide blocks. This ensures that the color characteristics of the narrow FOV image stream are aligned with the wide FOV image stream, maintaining color consistency across the combined image output. Optionally, the two matrices may be combined into a single 3×3 matrix for streamlined processing.

In an embodiment, the semantic information is utilized to identify scene type for a previous frame of the wide FOV image stream, and wherein processing the narrow FOV image stream comprises applying scene-specific image enhancements to the narrow FOV image stream based on the scene type of the previous frame of the wide FOV image stream to maintain visual consistency with the wide FOV image stream. Herein, the semantic information may include an understanding of the scene type, which may include classifications such as landscape, portrait, indoor, and outdoor scenes. This allows for the application of scene-specific image enhancements to the narrow FOV image stream, ensuring that the processing is contextually appropriate and aligns with the broader characteristics captured in the wide FOV image stream. For example, a landscape scene may require enhancements that emphasize natural colors and horizons, while an indoor scene may require adjustments for artificial lighting conditions. Further, the semantic information may include human skin tone information and the like, such as for applying beautification enhancements and ensuring natural and appealing skin representation, particularly for portrait scenes where aesthetically pleasing representation of skin tones is often desirable. By incorporating these scene-specific and context-aware processing enhancements, the process ensures that the narrow FOV image stream is not only visually consistent with the wide image FOV stream, but also has improved image quality for producing final image.

In an embodiment, for stereo image pairs, processing the narrow FOV image stream comprises utilizing a weighted average of corresponding one or more of the white balance information, the gamma or tone mapping information, the semantic information from two previous frames of the processed wide FOV image stream. This process is particularly adapted for scenarios involving handling two different FOV streams intended for stereo imaging, a technique commonly used in VR/AR to create a sense of depth. Herein, the processing of the narrow FOV image stream is based on the weighted average calculation that incorporates key image attributes from two previous frames of the processed wide FOV image stream. These attributes include white balance information, gamma or tone mapping information, and semantic information. The use of the weighted average allows for a more balanced integration of the image attributes from the wide FOV image stream into the processing of the narrow FOV image stream. This approach, while ensuring visual consistency, also maintains the necessary coherence between the stereo pair, and is particularly advantageous in stereo imaging applications, where discrepancies between the two images can significantly impact the user experience.

The method further includes blending of the processed wide and narrow FOV image streams for generating the final image. This blending process merges the characteristics of the wide FOV image stream and the narrow FOV image stream into a single, cohesive final image, in consideration of various image attributes. As discussed, the wide FOV image stream typically provides a comprehensive view of the scene, capturing its overall context and background, while the narrow FOV image stream focuses on specific details or subjects within that scene. Blending these multiple streams involves aligning their visual characteristics, such as color balance, brightness, and contrast. For this purpose, the blending process may employ advanced algorithms that consider factors such as the alignment of common elements between the two streams, the gradation of colors and tones at the merging points, and the overall aesthetic composition of the final image. This creates the final image, enhancing the overall image quality without any noticeable discontinuities or inconsistencies, particularly for applications like VR and AR, where the visual integrity of the final image is an important factor.

In some embodiments, the method further comprises concurrently training the neural network using each newly generated frame of the processed wide FOV image stream. This training process involves using each newly generated frame of the processed wide FOV image stream as input data for the neural network. Herein, the neural network may receive processed image data derived from images processed via a conventional image signal processor (ISP), specifically focusing on regions that correspond to both the wide FOV image stream and the narrow FOV image stream. The ISP-processed images provide the neural network with information on how conventional image processing techniques interpret and handle the scene, including adjustments like automatic white balance (AWB), color correction, and other standard image enhancements. The neural network may also receive corresponding RAW images (and/or RGB images), which represent unprocessed, pure sensor data, providing a detailed and unaltered view of the scene. The training of the neural network involves aligning these data sources against a set of objective loss terms, for effectively training the neural network to process the narrow FOV image stream. These terms may include color error, L1 (mean absolute error), and L2 (mean squared error) terms, among others. This approach is designed to continually refine and enhance the performance of the neural network over time, adapting to various imaging conditions.

The present disclosure also relates to the second aspect as described above. Various embodiments and variants disclosed above, with respect to the aforementioned first aspect apply mutatis mutandis to the second aspect.

The architecture of the system for processing dual-stream images is designed to facilitate seamless interaction between its components. The first processing module for the wide image FOV stream and the neural network for the narrow image FOV stream are interconnected, allowing for efficient data exchange and processing. The memory unit plays a role in bridging these components, acting as a repository for vital image attributes for further processing of the narrow FOV image stream. The blending module, equipped with advanced algorithms, combines the processed streams and ensures that the final image maintains the integrity and quality of each individual stream.

In an embodiment, the second processing module is configured to process the narrow FOV image stream by adjusting a color temperature of the narrow FOV image stream based on the color information from a previous frame of the wide FOV image stream to maintain color consistency with the wide FOV image stream.

In an embodiment, the second processing module is configured to process the narrow FOV image stream by applying a color conversion matrix to convert a color space of the narrow FOV image stream based on the color information from a previous frame of the wide FOV image stream to maintain color consistency with the wide FOV image stream.

In an embodiment, the second processing module is configured to process the narrow FOV image stream by adjusting a gamma or tone mapping value of the narrow FOV image stream based on the gamma or tone mapping information from a previous frame of the wide FOV image stream to maintain dynamic range consistency with the wide FOV image stream.

In an embodiment, the semantic information is utilized to identify scene type for a previous frame of the wide FOV image stream, and wherein the second processing module is configured to process the narrow FOV image stream by applying scene-specific image enhancements to the narrow FOV image stream based on the scene type of the previous frame of the wide FOV image stream to maintain visual consistency with the wide FOV image stream.

In an embodiment, the system further comprises a training module configured to concurrently train the neural network using each newly generated frame of the processed wide FOV image stream.

In an embodiment, the display device is a head-mounted display (HMD) as part of an extended reality (XR) system. HMDs are wearable devices that present visual content directly to the user's field of vision, often covering the entire sightline to create a fully immersive experience. In XR, which encompasses virtual reality (VR), augmented reality (AR), and mixed reality (MR), HMDs are employed for delivering the visual component of the immersive experience. The ability of the system to process dual FOV image streams effectively and blend them into the final image makes it an ideal solution for HMD-based XR applications.

The method and the system of the present disclosure are versatile and can be implemented in various applications, ranging from VR and AR to advanced photographic systems. The adaptability of the present method and system to different types of image content and processing requirements makes these a robust solution for multiple domains. By utilizing information from the wide image FOV stream to inform the processing of the narrow image FOV stream, the present method and system ensure a high degree of consistency in color balance, gamma values, and overall scene context. The use of the neural network for processing the narrow image FOV stream, coupled with its concurrent training, allows to adapt dynamically to changing conditions, as required in real-time applications such as VR and AR, where immediate responsiveness to environmental changes enhances the user experience.

DETAILED DESCRIPTION OF THE DRAWINGS

Referring to FIG. 1, illustrated is a flowchart of a method 100 for processing dual-stream images, in accordance with embodiments of the present disclosure. At step 110, the method 100 includes processing a wide field-of-view (FOV) image stream using a first processing technique. At step 120, the method 100 includes storing one or more of color information, gamma or tone mapping information, semantic information from the wide FOV image stream. At step 130, the method 100 includes processing a narrow FOV image stream using a neural network based on the one or more of the white balance information, the gamma or tone mapping information, and semantic information. At step 140, the method 100 includes blending the processed wide FOV image stream and the processed narrow FOV image stream to generate a final image, for display on a display device.

The aforementioned steps are only illustrative, and other alternatives can also be provided where one or more steps are added, one or more steps are removed, or one or more steps are provided in a different sequence without departing from the scope of the claims herein.

Figure 2:
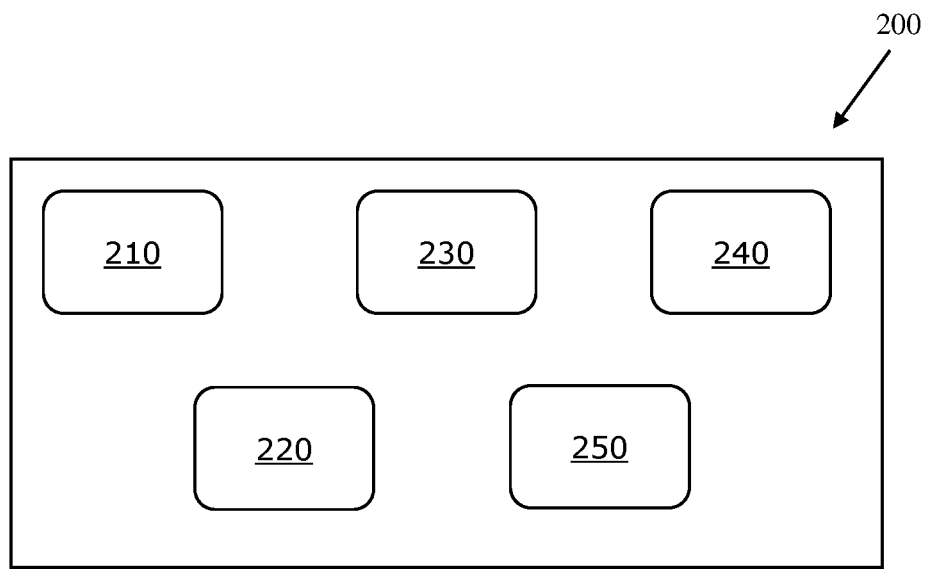
FIG. 2 is an illustration of a block diagram of an apparatus for processing dual-stream images, in accordance with embodiments of the present disclosure.

Referring to FIG. 2, illustrated is a block diagram of an apparatus 200 for processing dual-stream images, in accordance with embodiments of the present disclosure. The apparatus 200 includes a first processing module 210, a memory module 220, a second processing module 230 having a neural network 232, and a blending module 240. In some examples, the apparatus 200 further includes a training module 250.

Figure 3:
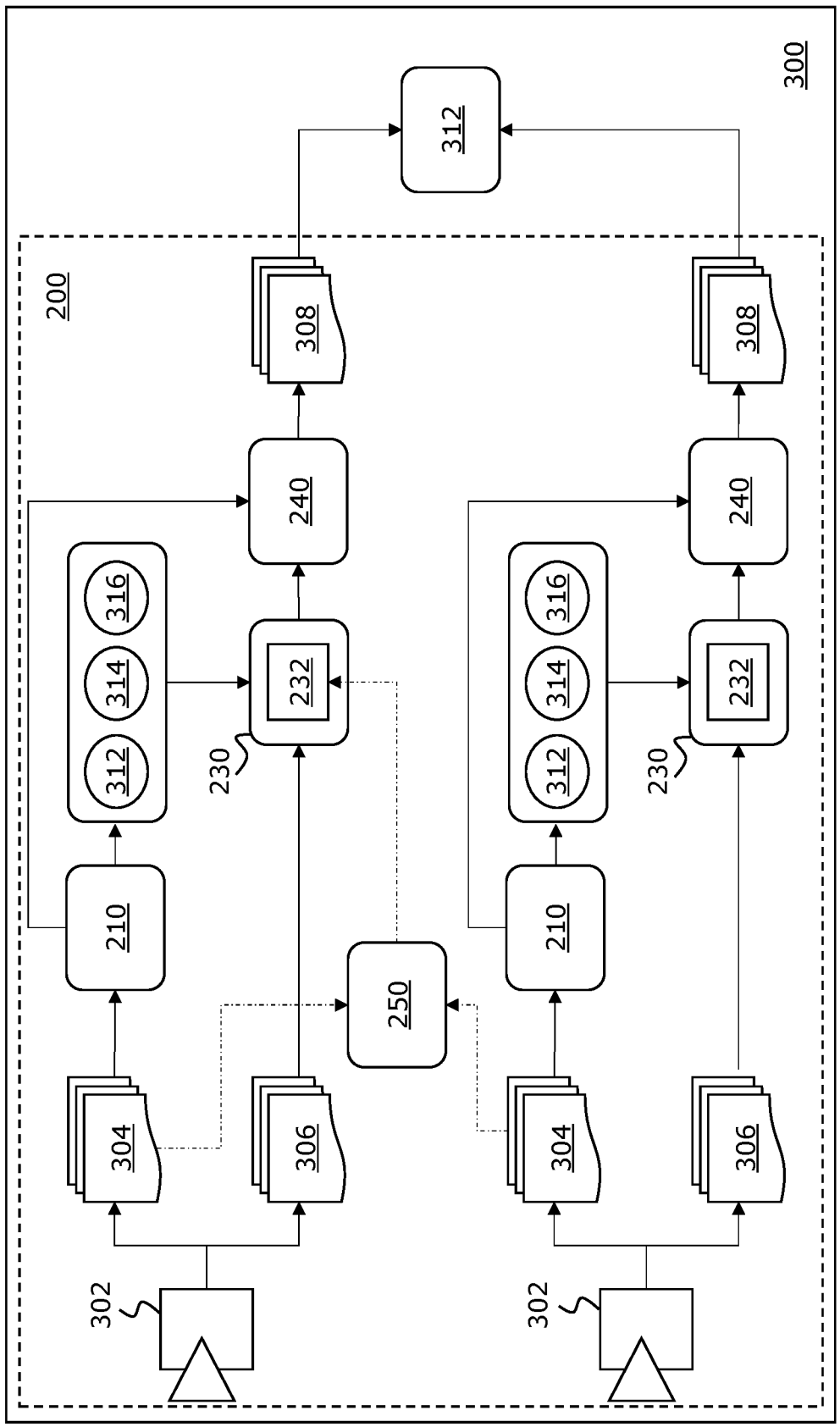
FIG. 3 is an illustration of a schematic block diagram of implementation of the apparatus for processing dual-stream images, in accordance with embodiments of the present disclosure.

Referring to FIG. 3, illustrated is a schematic block diagram of implementation of the apparatus 200 for processing dual-stream images, in accordance with embodiments of the present disclosure. The apparatus 200 includes one or more image sensors 302 to capture a wide field-of-view (FOV) image stream 304 and a narrow FOV image stream 306. The apparatus 200 has the first processing module 210 configured to process the wide FOV image stream 304 using a first processing technique. The apparatus 200 also has the memory module 220 configured to store one or more of color information 312, gamma or tone mapping information 314, semantic information 316 from the wide FOV image stream 304. The apparatus 200 further includes a second processing module 230 configured to implement the neural network 232 for processing the narrow FOV image stream 306 based on the one or more of the white balance information 312, the gamma or tone mapping information 314, and the semantic information 316. The apparatus 200 further has the training module 250 configured to concurrently train the neural network 232 using each newly generated frame of the processed wide FOV image stream 304. The apparatus 200 further has the blending module 240 configured to blend the processed wide FOV image stream 304 and the processed narrow FOV image stream 306 to generate a final image 308, for display on a display device 312, as part of an extended reality (XR) system 300.

The invention claimed is:

1. A method for processing dual-stream images, the method comprising:
processing a wide field-of-view (FOV) image stream using a first processing technique;
storing one or more of color information, gamma or tone mapping information, semantic information from the wide FOV image stream;
processing a narrow FOV image stream using a neural network based on the one or more of the white balance information, the gamma or tone mapping information, and semantic information; and
blending the processed wide FOV image stream and the processed narrow FOV image stream to generate a final image, for display on a display device.

2. The method of claim 1, wherein processing the narrow FOV image stream comprises adjusting a color temperature of the narrow FOV image stream based on the color information from a previous frame of the wide FOV image stream to maintain color consistency with the wide FOV image stream.

3. The method of claim 1, wherein processing the narrow FOV image stream comprises applying a color conversion matrix to convert a color space of the narrow FOV image stream based on the color information from a previous frame of the wide FOV image stream to maintain color consistency with the wide FOV image stream.

4. The method of claim 1, wherein processing the narrow FOV image stream comprises adjusting a gamma or tone mapping value of the narrow FOV image stream based on the gamma or tone mapping information from a previous frame of the wide FOV image stream to maintain dynamic range consistency with the wide FOV image stream.

5. The method of claim 1, wherein the semantic information is utilized to identify scene type for a previous frame of the wide FOV image stream, and wherein processing the narrow FOV image stream comprises applying scene-specific image enhancements to the narrow FOV image stream based on the scene type of the previous frame of the wide FOV image stream to maintain visual consistency with the wide FOV image stream.

6. The method of claim 5, wherein the wide FOV image stream is segmented corresponding to the narrow FOV image stream for extracting the semantic information.

7. The method of claim 1, wherein for stereo image pairs, processing the narrow FOV image stream comprises utilizing a weighted average of corresponding one or more of the white balance information, the gamma or tone mapping information, the semantic information from two previous frames of the processed wide FOV image stream.

8. The method of claim 1 further comprising concurrently training the neural network using each newly generated frame of the processed wide FOV image stream.

9. The method of claim 1, wherein the first processing technique comprises utilizing one or more of a hardware-based image signal processor (ISP), a software-based ISP, a neural network.

10. A system for processing dual-stream images, the system comprising:
a first processing module configured to process a wide field-of-view (FOV) image stream using a first processing technique;
a memory module configured to store one or more of color information, gamma or tone mapping information, semantic information from the wide FOV image stream;
a second processing module configured to implement a neural network for processing a narrow FOV image stream based on the one or more of the white balance information, the gamma or tone mapping information, and the semantic information; and
a blending module configured to blend the processed wide FOV image stream and the processed narrow FOV image stream to generate a final image, for display on a display device.

11. The system of claim 10, wherein the second processing module is configured to process the narrow FOV image stream by adjusting a color temperature of the narrow FOV image stream based on the color information from a previous frame of the wide FOV image stream to maintain color consistency with the wide FOV image stream.

12. The system of claim 10, wherein the second processing module is configured to process the narrow FOV image stream by applying a color conversion matrix to convert a color space of the narrow FOV image stream based on the color information from a previous frame of the wide FOV image stream to maintain color consistency with the wide FOV image stream.

13. The system of claim 10, wherein the second processing module is configured to process the narrow FOV image stream by adjusting a gamma or tone mapping value of the narrow FOV image stream based on the gamma or tone mapping information from a previous frame of the wide FOV image stream to maintain dynamic range consistency with the wide FOV image stream.

14. The system of claim 10, wherein the semantic information is utilized to identify scene type for a previous frame of the wide FOV image stream, and wherein the second processing module is configured to process the narrow FOV image stream by applying scene-specific image enhancements to the narrow FOV image stream based on the scene type of the previous frame of the wide FOV image stream to maintain visual consistency with the wide FOV image stream.

15. The system of claim 10 further comprising a training module configured to concurrently train the neural network using each newly generated frame of the processed wide FOV image stream.

16. The system of claim 10, wherein the display device is a head-mounted display (HMD) as part of an extended reality (XR) system.

* * * * *